(12) United States Patent
Henning

(10) Patent No.: US 6,536,836 B1
(45) Date of Patent: Mar. 25, 2003

(54) WIND DEFLECTOR FOR VEHICLE MOUNTED TARPING SYSTEM

(75) Inventor: Steven A. Henning, Speedway, IN (US)

(73) Assignee: Aero Industries, Indianapolis, IN (US)

( * ) Notice: Subject to any disclaimer, the term of this patent is extended or adjusted under 35 U.S.C. 154(b) by 0 days.

(21) Appl. No.: 10/163,702

(22) Filed: Jun. 5, 2002

(51) Int. Cl.[7] .............................................. B62D 35/00
(52) U.S. Cl. ...................................... 296/180.1; 296/98
(58) Field of Search ........................... 296/180.1, 180.4, 296/98, 100.9, 100.15, 100.18; 160/323.1, 238

(56) References Cited

U.S. PATENT DOCUMENTS

| | | | | |
|---|---|---|---|---|
| 3,999,797 | A | * 12/1976 | Kirsch et al. ............. | 296/180.4 |
| 5,031,955 | A | * 7/1991 | Searfoss ...................... | 296/98 |
| 5,078,446 | A | * 1/1992 | Walter .......................... | 296/98 |
| 5,165,461 | A | * 11/1992 | Haddad, Jr. .................. | 296/98 |
| 5,179,991 | A | * 1/1993 | Haddad, Jr. .................. | 296/98 |
| 5,378,035 | A | * 1/1995 | Wu .............................. | 296/98 |
| 5,996,867 | A | * 12/1999 | Burgess et al. ............... | 296/98 |
| 6,010,173 | A | * 1/2000 | Chyan-Luen ................ | 296/98 |
| 2002/0033615 | A1 | * 3/2002 | Henning ...................... | 296/98 |
| 2002/0067048 | A1 | * 6/2002 | Haddad, Jr. .................. | 296/98 |

OTHER PUBLICATIONS

Roll–Rite Electric Tarp Systems Gear Motor & Axle Kit Mounting Instructions, Roll–Rite Corp. Website, Web Page printed Sep. 29, 2002.*

7800GL Instatllation Instructions, Donovan Enterprises Website, Web Page printed Sep. 29, 2002.*

Tandem 15' End Dump–DGg, Roll–Rite Corp. Website, Web Page printed Sep. 29, 2002.*

Easy Cover Tarping System, Easy Cover (Copyright 1999 Aero Industries, Inc.).

Housing Options (http://www.aeroindustries.com/products/dump/housing.html, Copyright 2002 Aero Industires, Inc.).

* cited by examiner

*Primary Examiner*—D. Glenn Dayoan
*Assistant Examiner*—Jason Morrow

(57) ABSTRACT

A wind deflector assembly for a roll tarping system mounted on a vehicle includes a pair of side mounting plates, each associated with a corresponding opposite end of the roll tarping system. Each of the mounting plates includes a first edge and at least one flange projecting from a notch formed in the first edge of the mounting plate. An elongated deflector plate includes at least one variable location mounting element defined on an inner surface thereof. Each mounting element is arranged to be aligned with a corresponding flange when the deflector plate is mounted to the side mounting plates. The flange includes a fastener opening, while the mounting element includes a T-slot and channel. At least two fasteners are provided for connecting the deflector plate to each side mounting plate. The fastener can include a bolt sized to slide within the T-slot and channel, and a nut that is threaded onto the bolt when it extends from the mounting element through the opening in the flanges. The deflector plate is provided in a length that is greater than the necessary width to cover the tarping system. The deflector plate is cut to length during installation.

28 Claims, 8 Drawing Sheets

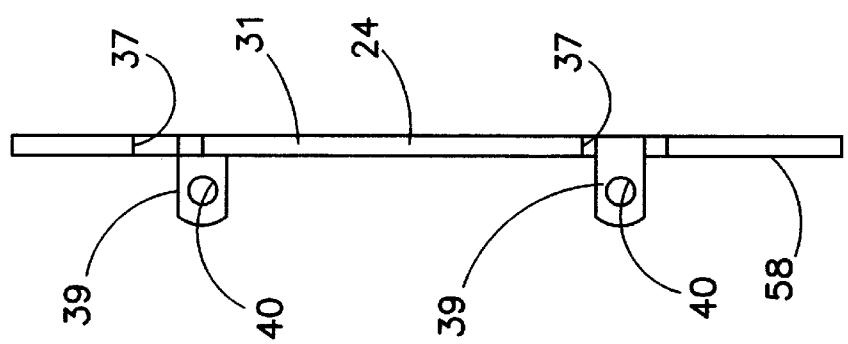
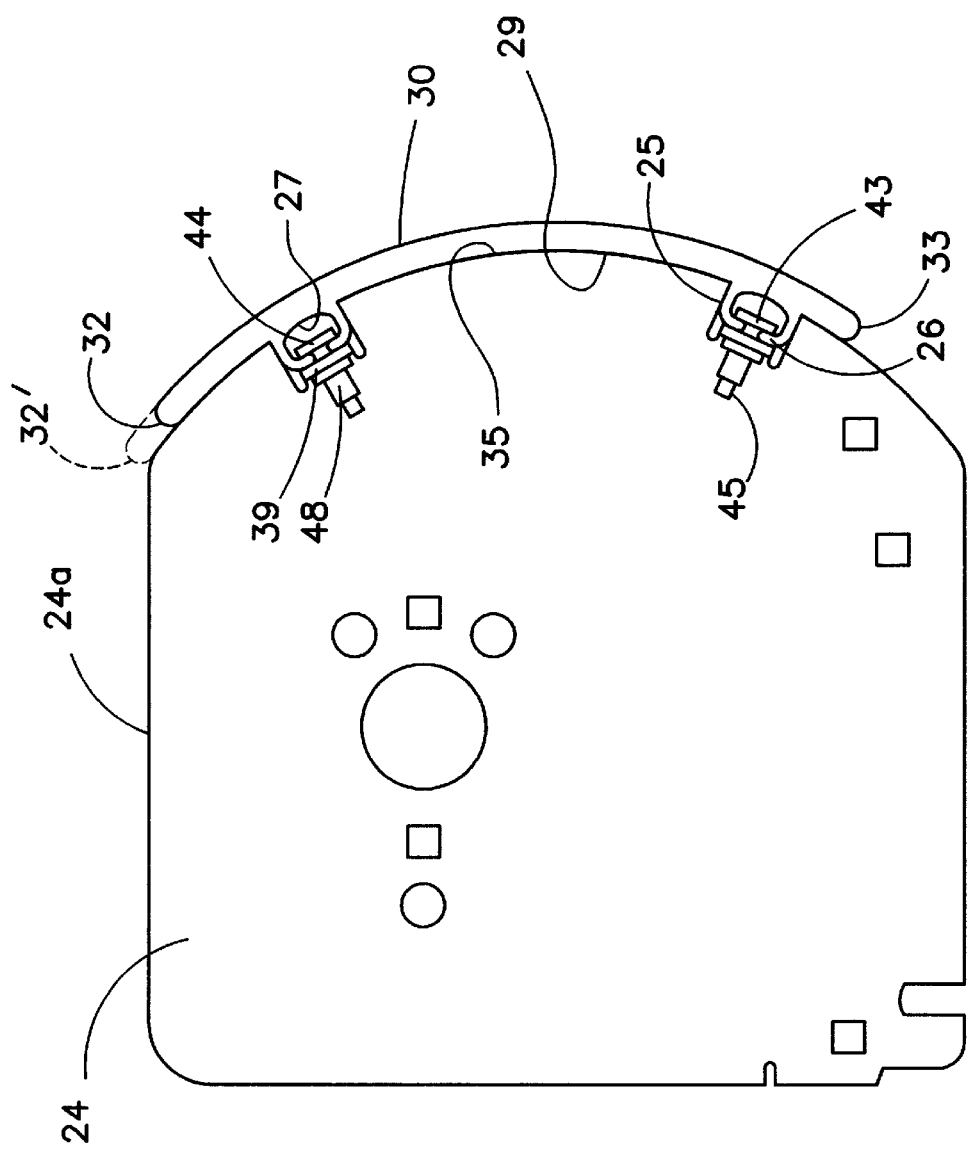
FIG. 3
FIG. 4

WIND DEFLECTOR FOR VEHICLE MOUNTED TARPING SYSTEM

BACKGROUND OF THE INVENTION

The present invention relates to extendable and retractable tarping systems, particularly for vehicles. More specifically, the invention relates to roll tarping systems in which an extendable tarp is wound onto a roller mounted at the front of the vehicle.

Hauling vehicles frequently use tarping systems to help cover the load within the container body of the vehicle. A dump truck, such as the truck 10 shown in FIG. 1, includes a dump body 11 configured for carrying a wide range of material. For instance, the dump body can be filled with gravel, dirt and agricultural products, such as grain. In one type of truck, the dump body extends over the vehicle cab by way of a cab shield 12.

In order to protect the contents within the dump body, and to prevent the contents from blowing out of the body 11 while the vehicle is traveling down the road, a tarping system 14 can be mounted to the cab shield 12 or to the front end of the container body 11. In a typical installation, the roll tarp system 14 can include a spindle or roller 15 onto which a tarp 13 is rolled when it is moved to its retracted position. An extension arm 16 can be provided that pulls the tarp across the dump body 11 and that controls the retraction of the tarp 13 back into roll tarp assembly 14. One typical tarping system of this type is the Easy Cover® of Aero Industries, Inc. With this type of system, torsion springs operate on the bail arms 16 to pull the tarp 13 across the length of the container body 11. The roll tarp assembly 14 can include a hand crank or a motor that resists the extension force applied by the extension arms 16 and that can be used to wind the tarp 13 onto the roller 15 when it is desired to retract the tarp cover.

Most hauling vehicles, such as the dump truck 10 shown in FIG. 1, are usually intended for over-the-road use, so they are subject to wind forces, particularly when traveling at highway speeds. The tarp 13, when extended, protects the contents of the dump bed from being dislodged by the wind passing over the body 11. In earlier tarping systems, it was found that the tarping system exerted a measurable amount of drag due to its prominence mounted on the cab shield 12. Of course, this additional drag reduced fuel economy for the vehicle. In addition, the wind passing over the tarp 13 would cause the tarp to flap and eventually cause the edges of the tarp to fray or to cause tears in the tarp.

In order to address this problem, most tarping systems, as represented by the Easy Cover® tarping system, include a wind shield or air deflector 18 mounted in front of the tarping system 14. The typical wind deflector exhibits a gradual curve and completely enshrouds the tarping mechanism mounted to the front of the truck bed. In some cases, the air deflector simply constitutes a plate bolted to the front of the cab shield. In more sophisticated systems, the air deflector can be integrated into an overall housing for supporting and containing the tarping assembly. In this case, the length of the wind deflector depends upon the width of the portion of the vehicle body to which the deflector is mounted. For instance, if the tarping system 14 is mounted to the cab shield 12, the wind deflector 18 has a length calibrated to the width of the cab shield, and likewise if the tarping system is mounted directly to the container body 11.

However, one difficulty is that not all cab shields or container bodies have the same dimensions or the same width. Moreover, different types of vehicles may require different types of tarping systems. Thus, the required length of the wind deflector 18 may vary greatly among vehicle applications. This variation has required stocking a wide arrange of wind deflector sizes to accommodate the trucks of potential customers. For instance, in typical dump truck applications, the wind deflector may need to be provided in lengths of 92 inches, 96 inches or 102 inches.

Alternatively, two-piece wind deflectors have been devised. Wind deflectors of this type, as depicted in FIG. 5, include at least two panels that have a length less than the entire width of a typical cab shield 12 or vehicle body 11. However, the length of each of the two pieces is at least greater than half the width of the largest width truck body contemplated for use with the wind deflector. Thus, the two panels can variable overlap each other to accomplish an overall combined length equal to the width of the cab shield or truck body. The two halves can then fastened together by sheet metal screws and the resulting wind deflector mounted in an appropriate manner to the vehicle. One problem with this approach is that the wind deflector must be provided in multiple pieces which complicates the installation of the deflector. Another problem is that the connection between the two wind deflector pieces can wear out over time due to vibration and exposure to the elements. One advantage, of course, of this two-piece wind deflector is that it can accommodate any size cab shield or container body.

While the two-piece wind deflector system presents some advantages over the one-piece wind deflector, there is still room for improvement. What is needed is a system that retains the integrity of a one-piece wind deflector and combines that integrity with the versatility and variability of the two-piece wind deflector system.

SUMMARY OF THE INVENTION

In order to address this need, the present invention contemplates a wind deflector assembly for a roll tarping system mounted on a vehicle comprising a pair of side mounting plates, each associated with a corresponding opposite end of the roll tarping system. Each of the mounting plates includes a front edge and at least one support member disposed adjacent the front edge. In the preferred embodiment, the support member is a flange projecting from a notch formed in the front edge of each side mounting plate.

The wind deflector assembly further includes an elongated deflector plate that has at least one elongated or variable location mounting element defined on an inner surface thereof. Each mounting element is arranged to be aligned with a corresponding support member when the deflector plate is mounted to the side mounting plates. At least two fasteners are provided for connecting the variable location mounting member to the support member of each side mounting plate.

In accordance with one feature of the invention, the mounting elements allow engagement with the fasteners at continuously variable positions along the length of the mounting element. In a specific embodiment, the mounting elements include a T-slot opening into an enlarged channel. The fasteners can include a bolt having an enlarged head sized to slide within the channel but not pass through the T-slot. A threaded nut can be used to engage the bolt when the bolt passes through the T-slot and the opening a corresponding flange of the side mounting plates.

In a further aspect of the invention, the elongated deflector plate is provided in an initial length that is greater than a width dimension of the vehicle or the roll tarp system. The deflector plate can be cut to length to span exactly between the side mounting plates. The continuously variable mounting elements allow the deflector plate to be engaged to the side mounting plates regardless of the width between the plates.

Preferably, the front edge of each of the pair of mounting plates is curved and the inner surface of the deflector plate is complementary curved for a substantially flush engagement with the front edge of the side plates. In addition, the support members are arranged so that the bottom edge of the deflector plate will sit immediately adjacent the front edge of the vehicle container body or cab protector to which the roll tarping system is mounted. Each side plate includes features to permit mounting the plates to the side of the vehicle.

The present invention further contemplates a method for mounting a wind deflector to a vehicle having a roll tarping system. In a first step, a pair of mounting plates are mounted to the vehicle at opposite ends of the roll tarping system. An elongated deflector plate can be provided that has an initial length greater than the width necessary for covering the roll tarping system. For instance, the deflector plate can be provided in a length of 110 inches, although most hauling trucks have a width at the tarping system of 92, 96 or 102 inches.

In a further step, the required length of the deflector plate is determined, preferably by measuring the distance between the side mounting plates when they are mounted to the vehicle. The deflector plate is then cut to a length that substantially matches the measured distance.

The deflector plate is provided with at least one continuously variable mounting element defined at an inner surface of the plate. The deflector plate can be engaged to each mounting plate at variable locations along each continuously variable mounting element. In this way, the engagement between the side mounting plates and the deflector plate is not disrupted when the deflector plate is cut to the appropriate size.

In an alternative embodiment, a wind deflector assembly is provided in the form of a substantially enclosed box. In particular, the assembly includes a pair of side mounting plates and a front deflector plate, similar to those of the first embodiment. The side mounting plates are modified to include additional flange attachment elements on the top, bottom and rear edges of the plates. The wind deflector assembly then includes a top plate, bottom plate and rear plate that include mounting elements as described above to mate with correspondingly located flange attachment elements on the side mounting plates. The rear plate spans only a portion of the rear of the assembly to provide a path for the flexible cover carried by the roller assembly housed inside the wind deflector assembly.

In one feature of this embodiment, the rear plate can include a portion traversing the bottom of the side mounting plates. This portion defines a gap between it and the bottom plate, with the gap residing adjacent the cab shield. A spanning plate can be provided that spans this gap and interconnects the bottom and rear plates. In addition, the spanning plate can provide a means for mounting the entire assembly to the cab shield.

In another feature of this embodiment, the top plate and front deflector plate can be interconnected by way of a spanning bracket. The spanning bracket, like the spanning plate, includes end portions configured to mate with a mounting element on the respective plate. A fastener can be used to engage the spanning bracket to the mounting element, thereby interconnecting the two plates.

It is one object to provide a wind deflector system for use with a roll taping system mounted on a hauling vehicle. A further object is to provide such a system that can be easily and quickly installed.

One benefit of the invention is that the deflector plate can be provided in one length that is cut to fit for any vehicle application. Another benefit accomplished by the inventive wind deflector system is the presentation of an aerodynamic and clean appearance.

Other objects and benefits of the present invention can be discerned from the following written description taken together with the accompanying figures.

DESCRIPTION OF THE FIGURES

FIG. 3 is a front elevational view of a side mounting plate component of the wind deflector assembly as shown in FIG. 2.

FIG. 4 is a side elevational view of the inventive wind deflector assembly shown in FIG. 2 with the components assembled together.

DESCRIPTION OF THE PREFERRED EMBODIMENTS

Figure 1:
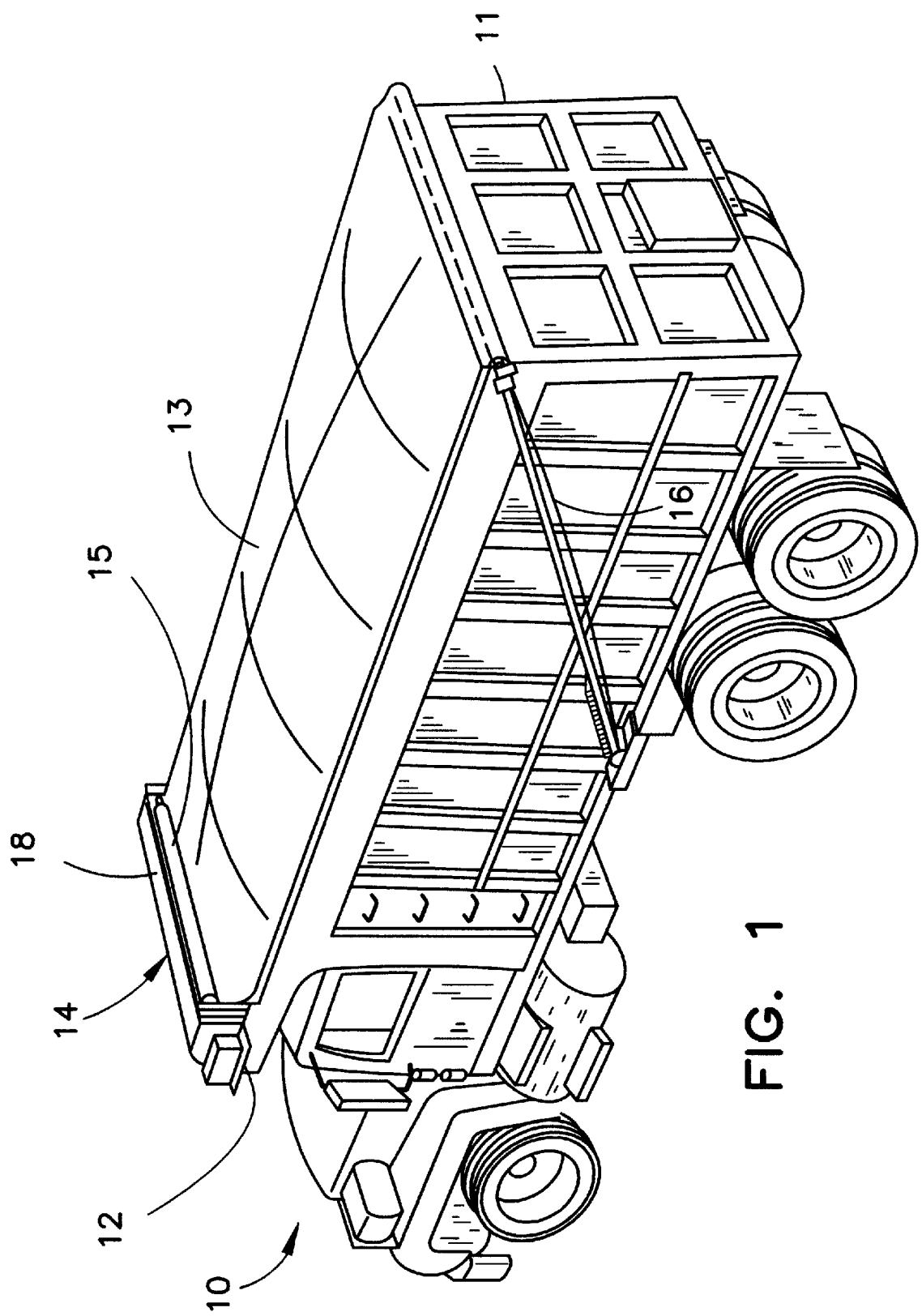
FIG. 1 is a perspective view of a vehicle using a roll tarping system to be protected by the wind deflector of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
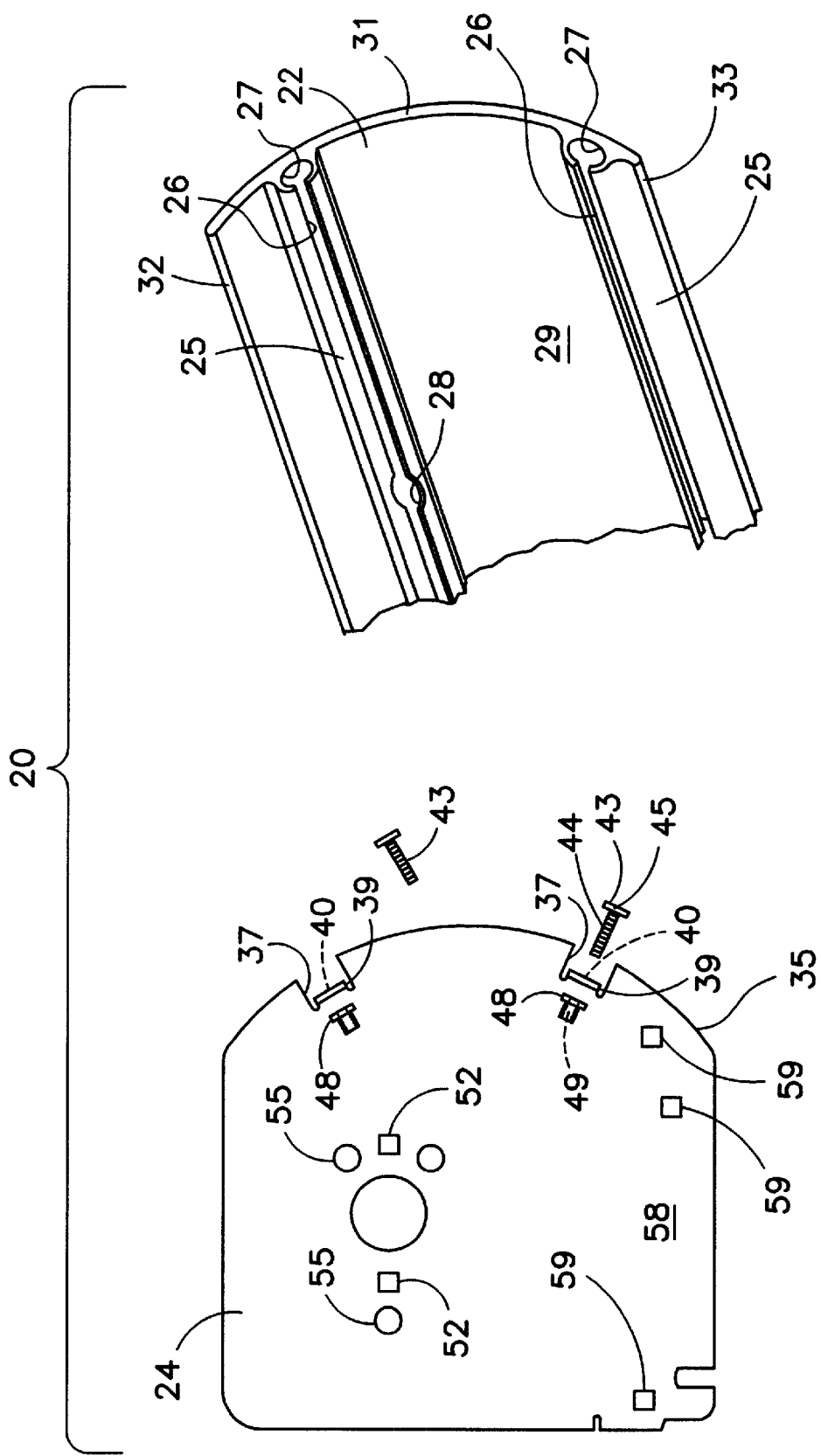
FIG. 2 is an exploded view of the components of a wind deflector system in accordance with one embodiment of the present invention.

Referring now to FIG. 2, a wind deflector assembly 20 is illustrated that includes a deflector plate 22 and a pair of side plates 24. The deflector plate 22 is an elongated plate that has a length that exceeds the maximum width of a cab protector or vehicle container body. For illustrative purposes, only an end portion of the plate 22 is shown in the figure, with the understanding that the remainder of the plate is identically constructed. In other words, the plate can be formed as an extrusion of constant cross-section along its length.

In accordance with one feature of the present invention, the deflector plate 22 includes an elongated variable location mounting element 25. extending substantially along the entire length of the plate. More specifically, two such mounting elements are provided adjacent the opposite upper and lower edges 32, 33, respectively. Preferably, the mounting element 25 extends to each end edge 31 of the plate 22.

In accordance with the preferred embodiment of the invention, the mounting element 25 includes a T-slot 26 that defines or communicates with a channel 27. As depicted in FIG. 2, the T-slot 26 and channel 27 are open at the end edge 31 of the deflector plate 22 for reasons explained below.

The deflector plate 22 defines an inner surface 29 that faces the side mounting plate 24. More specifically, the inner surface 29 is complementary configured to provide a flush engagement with a forward edge 35 of each mounting plate 24. The curvature of the inner surface 29 and the forward edge 35, and ultimately the overall curvature of the deflector plate, can be calibrated to provide an optimum aerodynamic wind deflecting effect. In addition, the angular orientation of the deflector plate can be adjusted relative to the front of the container body or cab protector to further improve the aerodynamics of the assembly 20.

In accordance with the preferred embodiment, the mounting element 25 projects inwardly from the inner surface 29 toward the forward edge 35 of each mounting plate 24. Consequently, the forward edge defines a notch 37 sized to receive a corresponding mounting element 25. In the specific illustrated embodiment, two mounting elements 25 are provided, so two notches 37 are defined in the forward edge 35. It is understood that the orientation and spacing between the two notches 37 is determined by the orientation and spacing between the two mounting elements 25. Moreover, the placement of the two notches relative to the mounting plate 24 itself will determine the particular orientation or angular position of the deflector plate 22 relative to the container body when it is supported to the mounting plate 24.

As shown best FIG. 3, each notch 37 includes a support member 39, which, in the preferred embodiment is a bent flange that projects substantially perpendicularly from the mounting plate 24. Each support member or bent flange 39 defines a fastener opening 40 therethrough. As illustrated in FIG. 4, the notch 37, bent flange 39 and particularly the fastener opening 40 are arranged to be aligned with the T-slot 26 of each mounting element 25. Specifically, the fastener opening 40 can communicate with the T-slot 26 so that a fastener 43 can extend between the two mounting components. The fastener 43 includes an enlarged head 44 that is sized for sliding engagement within the channel 27 of the mounting element 25. The fastener 43 also includes a shank portion 45 that is sized to extend through the T-slot 26 as well as through the fastener opening 40.

In a specific preferred embodiment, the fastener 43 is a carriage-type bolt having a non-circular, and preferably hexagonal, head 44. The carriage bolt can be slid into the channel 27 of the mounting element 25 at the end edge 31 of the deflector plate 22. Since the head 44 is not circular, the fastener is not permitted to rotate relative to the T-slot 26, although it is free to slide along the entire length of the mounting element 25. The fastener 43 is provided with a mating fastener 48 that defines a bore 49 to receive the shank portion 45 of the fastener therethrough. As illustrated in FIGS. 2 and 4, the enlarged head of the fastener 44 is disposed with in the T-slot 27 of the mounting element 25, with the shank portion 45 extending through the T-slot. The shank 45 then also extends through the opening 40 for engagement with the mating fastener 48. Again, in the specific embodiment the mating fastener 48 is a threaded nut to mate with the threaded shank of the carriage bolt fastener 43. Alternatively, the shank portion 45 of the fastener 43 and the mating fastener 48 can be configured for a press-fit or pressure-fit engagement. A threaded engagement may be preferred, together with a non-rotating fastener head, because it is easier to apply a solid clamping pressure between the fasteners 43 and 48 and the T-slot 46 and flange 39.

Referring back to FIG. 2, the side mounting plates 24 can include mounting features 52 for mounting the roll tarp mechanism to the wind deflector assembly 20. These features can include a circular opening to receive the spindle or roller 15 of the roll tarp system 14. In addition, similar mounting features 55 can be provided for mounting a mechanical or electrical drive to one or both of the side mounting plates 24.

Each of the side mounting plates 24 includes a plate mounting portion 58 at the bottom of each plate. This mounting portion allows mounting of the side plates 24 to the vehicle. Preferably, each side mounting plate 24 is mounted to opposite side flanges of a cab shield, such as shield 12 in FIG. 1, or to the container body itself, depending upon the particular roll tarp apparatus. The mounting portion 58 can include a number of mounting features 59 that can be used to fasten each side mounting plate 24 to the truck. Preferably, the mounting features include bolt holes that allow the side mounting plates to be bolted directly to the flanges of the cab shield or container body. In this respect, the wind deflector assembly 20 can use the same mounting features that are used to mount prior wind deflectors or roll tarp housings to a vehicle.

Figure 5:
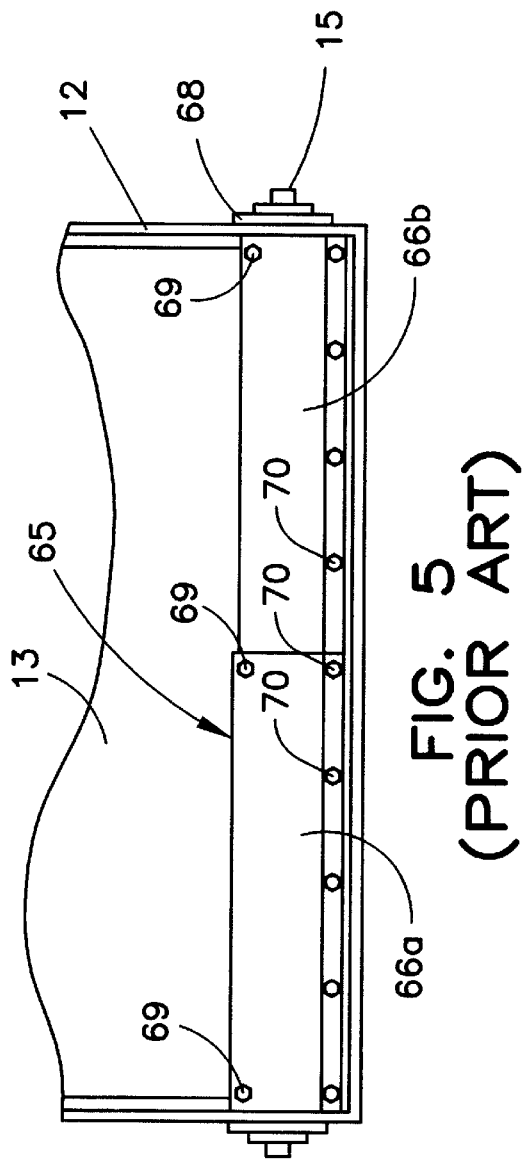
FIG. 5 is a top elevational view of a prior art two-piece overlapping wind deflector assembly.
Figure 6:
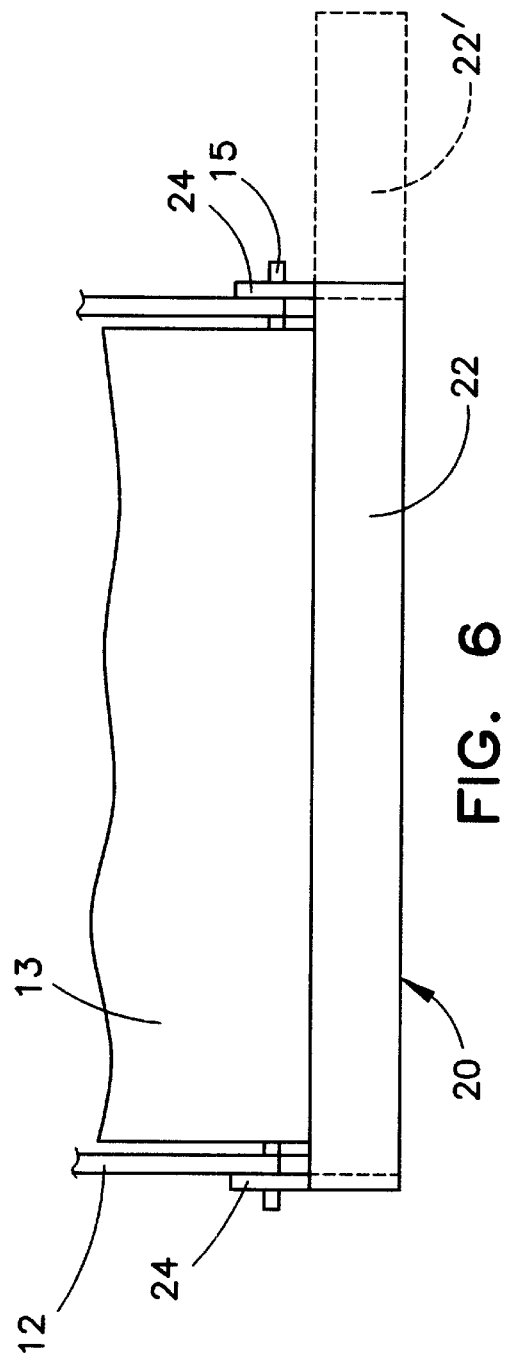
FIG. 6 is a top elevational view of a wind deflector assembly according one embodiment of the invention mounted to the front of a vehicle container body.

The use and benefits of the wind deflector assembly 20 of the present invention can be discerned by a comparison of the systems depicted in FIGS. 5 and 6. In FIG. 5, a prior two-piece system is shown. As described generally above, the deflector 65 includes overlapping pieces 66a and 66b. A pair of side mounting plates 68 are affixed to the container body or cab shield 12. These mounting plates 68 provide a means for supporting the roll top apparatus. In addition, each of the side mounting plates 68 can include a flange adapted to support the side edges of one of the overlapping pieces 66a, 66b. In this prior system, each of the pieces includes a flange that receives mounting screws 70 for fastening the front perimeter of the two pieces to the vehicle. In addition, screws 69 are provided that connect each of the two pieces 66a, 66b, to the corresponding side mounting plate 68. A screw 69 is also used to interconnect the two pieces at their overlapping location. In a typical installation, the screws are self taping machine screws that are threaded through holes drilled into the overlapping pieces. It can be appreciated from this description that the installation of the two-piece shield 65 can be labor intensive and cumbersome.

In contrast, as illustrated in FIG. 6, the wind deflector assembly 20 can be very easily installed on a vehicle. The first step in the installation is to mount the two side mounting plates 24 to opposite sides of the vehicle, such as opposite sides of the cab shield 12. The tarp roller assembly 14 can be supported between the mounting plates. In some installations, the roller 15 may extend through one of the mounting features 52 of the two mounting plates 24.

Once the mounting plates have been installed, the deflector plate 22 can be positioned over the forward edge 35 of each mounting plate 24. As illustrated in FIG. 6, the deflector plate 22 is longer than is necessary to span the width of the cab shield 12. Thus, the present invention contemplates an excess portion 22' of the deflector plate 22 that overhangs beyond the mounting plate 24. When the deflector plate 22 is positioned on the mounting plates 24, it is apparent how much excess length of the deflector plate must be removed for mounting on the particular vehicle. Thus, the excess portion 22' can be cut off from the remainder of the deflector plate 22. In the most preferred embodiment, the deflector plate 22 is formed of an aluminum material having a thickness on the order of ⅛ inch. Thus, the excess portion 22' can be cut fairly easily by a metal saw. The plate can be formed of other materials, such as stainless steel.

In an alternative embodiment, indicator marks can be made on the deflector plate 22 corresponding to specific vehicle widths. For instance, if a dump truck cab shield 22 is provided in specific widths, those particular widths can be marked and indicated on the deflector plate. As a further alternative, the deflector plate 22 can include a scoring feature corresponding to a cut point for specific length deflector plate. Thus, the indicator or scoring lines can be made at lengths of 92 inches, 96 inches and 102 inches. For that matter, the deflector plate 22 can be provided in the largest anticipated length (i.e. 102 inches), with inboard marks or score lines corresponding to the shorter dimensions.

In another preferred use of the invention, the deflector plate can be pre-measured and pre-cut to the proper size. In other words, once the side mounting plates 24 have been mounted to the vehicle, the distance between the outboard surfaces of the mounting plates can be measured and then that distance can then be used to mark a cut line on the deflector plate 22 to define the excess portion 22' to be removed. It is preferable that the length of the deflector plate 22 be such that its end edges 31 present a smooth transition to the outboard surfaces of the mounting plates 24.

Once the deflector plate 22 has been cut to size, fasteners 43 can be slid into the T-slot 26 of each of the mounting elements 25, preferably through the open end of the T-slot at each end edge 31. Alternatively, as depicted in FIG. 2, the T-slot 26 can be provided with an enlarged fastener opening 28 inboard of the end edge 31, but adjacent to a cut location on the plate. The fastener opening 28 can provide an aperture large enough to receive the head 44 of a fastener 43. Thus, the fastener 43 can be inserted into the T-slot 26 through a fastener opening 28, rather than from the open end of the T-slot 26.

With an appropriate number of fasteners 43 mounted in the upper and lower T-slots 26, the deflector plate 22 can be positioned with its inner surface 29 in direct contact with the forward edge 35 of the mounting plates 24. When the inner surface is brought into contact with the mounting plates, the mounting elements 25 are situated within the notches 37 in each of the side mounting plates. With some modest manipulation, the shank portion 45 of the fastener 43 can be extended through the fastener opening 40 in the bent flange 39 at each notch 37. This fastener 43 can be clamped to solidly engage the deflector plate to the mounting plate 24 by way of the mating fastener 48. In an alternative method, this process can occur before the excess portion 22' is severed from the remainder of the deflector plate. In other words, the over sized deflector plate 22 can be mounted to each of the mounting plates 24. At that point, the overhanging portion of the deflector plate 22 can be cut using the outboard surface of the mounting plate 24 as guide.

As can be seen in FIG. 4, each notch 37 has a width that is slightly wider than the corresponding T-slot 26. A snug fit between the T-slot and the notch 37 is preferable. In addition, the opening of the T-slot 26 is in close proximity to the bent flange 39, but with a slight gap to produce a solid engagement between of the components.

As also shown in FIG. 4, the lower edge 33 of the deflector plate 22 is preferably offset from the bottom edge of the mounting plate 24. With this arrangement, the lower edge 33 will be in close proximity to, or even contact with, the front flange of the vehicle body 11 or cab shield 22 when the plates are attached to the vehicle at the mounting portions 58. In this way, the wind deflector plate 22 can prevent air leaks under the deflector plate 22 and across the roll tarp.

In the illustrated embodiment, the upper edge 32 is generally aligned with the top edge 24a of the mounting plate 24, as shown in FIG. 4. Alternatively, the upper edge can extend beyond the plate edge, such as the edge position 32' in the figure.

In the preferred embodiment of the invention, the deflector plate 22 presents a forward surface 30 that is unblemished. In other words, no fasteners extend through the thickness of the deflector plate 22. Instead, the fastening mechanism, namely the mounting elements 25 and fasteners 43, are all hidden behind the deflector plate 22. With this configuration, the fasteners 43 and mating fasteners 48 can be substantially protected from the elements, thereby increasing the life of the fasteners relative to prior art devices.

Another obvious benefit of the present invention is the continually variable aspect of the engagement between the mounting plate 24 and the deflector plate 22. The mounting elements 25, and particularly the T-slot 26 and channel 27, provide infinite locations for the placement of fasteners 43. Thus, any variations in the width of a particular cab shield can be readily accommodated by the mounting element 25, even if the cab shield does not fall into one of the three standard vehicle widths. Moreover, the infinitely variable mounting elements 25 at the upper and lower portions of the deflector plate 22 mean that the plate can be readily engaged to a mounting plate 24 that is not exactly square with the remainder of the vehicle. For instance, if the plate is for some reason canted inward, the fastener engaging the upper flange or support member 39 to the upper mounting element 25 can be positioned further inboard than the fastener at the lower mounting element. In addition, the end edges 31 of the deflector plate 22 can be trimmed to exactly correspond to the outboard surface of each mounting plate 24, so that the overall wind deflector assembly 20 presents a sleek appearance.

In accordance with the preferred embodiment of the invention, the continuously variable mounting portion of the wind deflector assembly 20 is associated with the deflector plate 22. Moreover, the mounting elements 25 preferably project inwardly from the inner surface 29 of the deflector plate 22. With this configuration, each mounting plate 24 includes an indented notch 37 to receive a corresponding mounting element.

Alternatively, the recessed components can be the mounting element 25 recessed within the deflector plate 22. In this configuration, the notch 37 is eliminated, and the bent flange 39 projects outwardly from the forward edge 35. In this instance, the deflector plate 22 would need to be thicker to allow recessing the T-slot 26. Nevertheless, with this arrangement, the engagement between the deflector plate 22 and each of the mounting plates 24 is continuously variable, and the deflector plate 22 can be initially oversized in length so that it can be cut to fit the particular truck application.

In the preferred embodiment, the deflector plate 22 and side mounting plates 24 can be formed of a metal typically used in tarping system installations. Most preferably, the material is aluminum. In a specific embodiment, the deflector plate 22 can be formed in a continuous extrusion process, since the T-slot 26 and channel 27 readily lend themselves to this type of manufacturing. The outboard surfaces of the components of the wind deflector assembly 20 can be polished to present a sleek appearance, or can be painted to match the vehicle.

In further embodiment of the invention, a substantially enclosed box is defined by a wind deflector assembly configured as shown in FIGS. 7–10. The wind deflector assembly 75 can include a front deflector plate 22 constructed as described above. The deflector plate is mounted across two side mounting plates 77 that are similar to the mounting plate 24 described above. However, unlike the prior mounting plate, the mounting plate 77 does not include any features (such as features 58, 59) for mounting to the side of the cab shield. Instead, the mounting plate 77 provides an array of support members or attachment flanges 79 along the top, bottom and rear edges of the plate. The flanges 79 can be formed in the same manner as the flanges 39 described above.

In accordance with this embodiment of the invention, the flanges 79 provide means for attaching several plates to the side mounting plates 77 to form a generally enclosed volume within which the tarp roller assembly 14 can be housed. Specifically, the wind deflector assembly 75 can include a top plate 82, a bottom plate 84 and a rear plate 86. The top plate 82 can span the width of the mounting plate so that it provides a tight interface with the top edge 32' of the front deflector plate 22. Similarly, the bottom plate 84 can abut the lower edge 33 of the deflector plate.

Each of the plates 82, 84, and 86 includes a mounting element 90 that can be configured like the mounting element 25 described above. Each mounting element 90 mates with a corresponding attachment flange 79 of the side mounting plates 75. A plurality of fasteners 91 can be provided to connect each attachment flange to a portion of an aligned mounting element 90. As with the front deflector plate 22, each of the plates 82, 84, and 86 can be cut to fit from a single length. Each of the plates can also be formed of the same material as the deflector plate.

Figure 8:
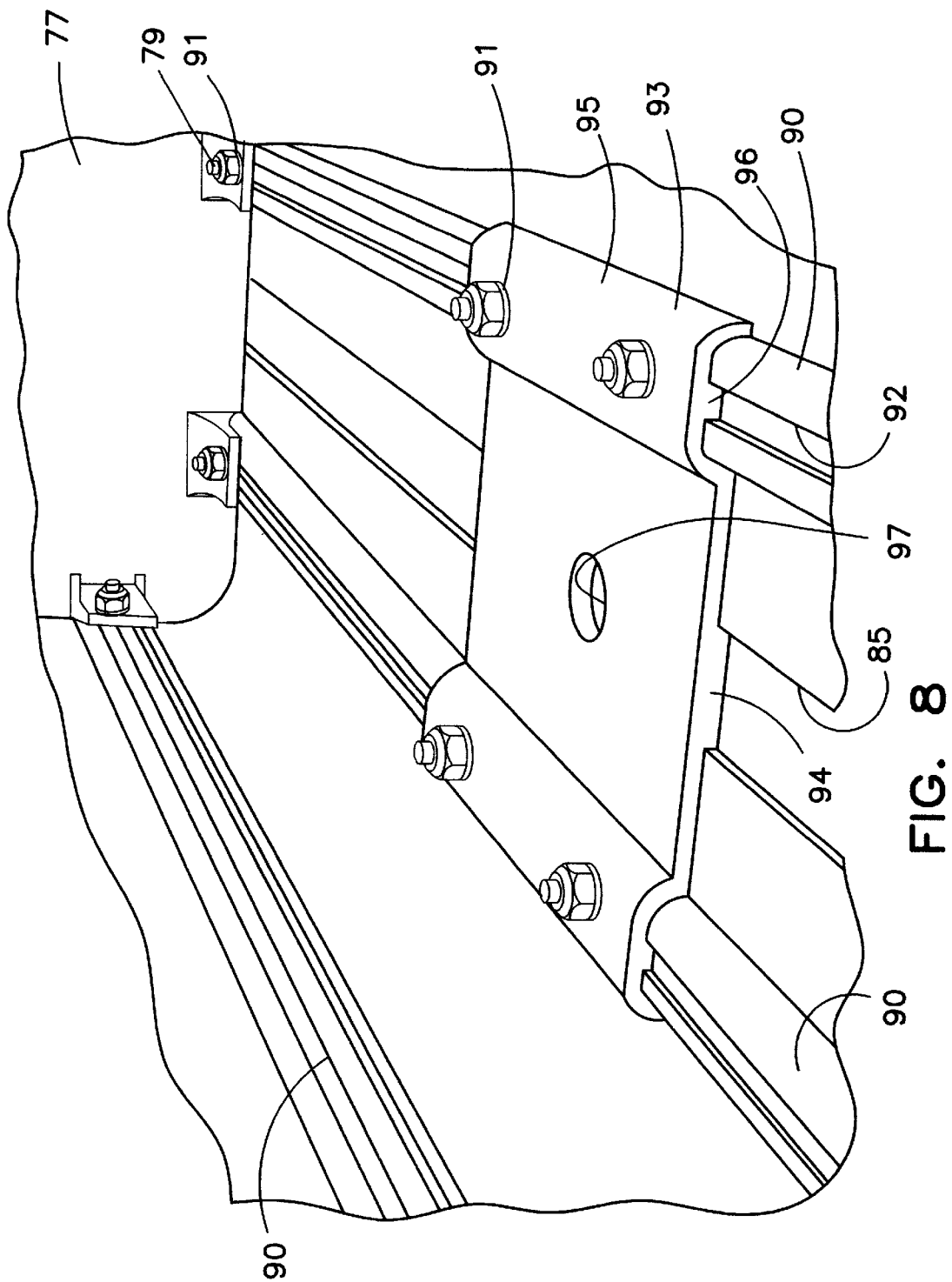
FIG. 8 is an enlarged perspective view of a portion of the wind deflector assembly shown in FIG. 7.

In one aspect of this alternative embodiment, the bottom plate 84 and rear plate 86 can define a gap 85 between the inboard edges of the plates, as best shown in FIG. 8. This gap 85 can provide means for mounting the complete wind deflector assembly 75 to the cab shield. In a preferred feature of this embodiment, at least one spanning plate 93 can be provided for spanning the gap 85 and interconnecting the bottom and rear plates. Thus, the spanning plate 93 can include a boss 94 that projects into the gap 85 to help position and stabilize the spanning plate. The opposite ends of the plate 93 define attachment portions 95 that are configured to mate with a corresponding mounting element 90 on the bottom plate 84 and rear plate 86. The attachment portions 95 can include a boss 96 that projects into the channel 92 of the mounting elements 90. The attachment portions 95 and the boss 96 can define bores to receive a fastener 91 for attaching the spanning plate 93 to each mounting element 90.

A plurality of these spanning plates 93 can be provided to interconnect the bottom and rear plates. The spanning plates thus provide additional strength and stability to the wind deflector assembly 75. In addition, the spanning plates can define an opening 97 that can receive a fastener for attaching the assembly 75 to the cab shield or container body.

Figure 7:
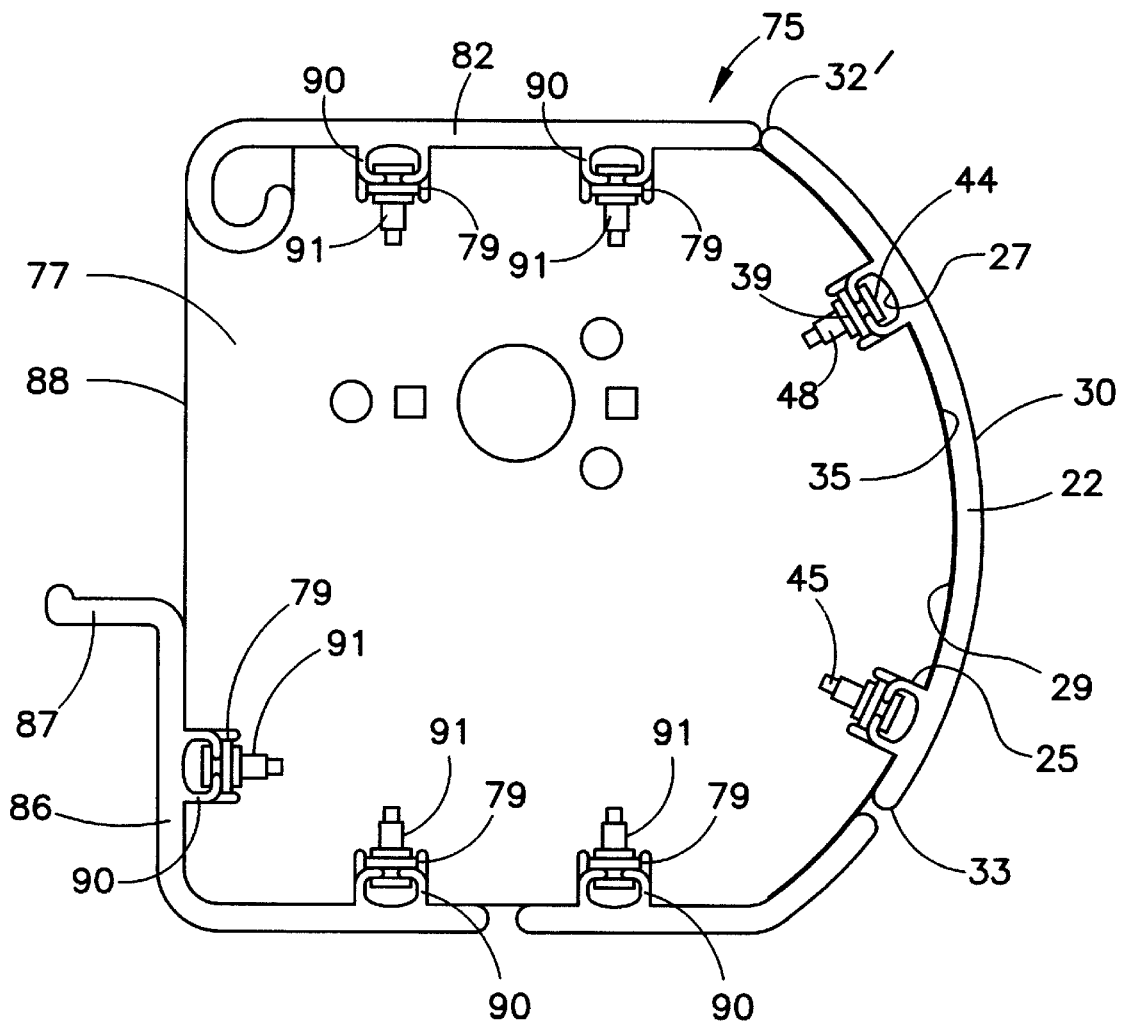
FIG. 7 is a side elevational view of a wind deflector assembly in accordance with an alternative embodiment of the invention.

As can be seen in FIG. 7, the rear plate 86 does not span across the entire height of the side mounting plates 77. More specifically, the rear plate defines a tarp opening 88 through which the flexible cover or tarp passes when it is extended. It is of course understood that the roller assembly 14 can be mounted to each of the mounting plates 77 and therefore enclosed within the box formed by the assembly 75. Naturally, an opening is required for passage of the tarp. The rear plate 86 can define a rearwardly projecting guide flange 87 to help support the tarp as it is extended or retracted.

Figure 9:
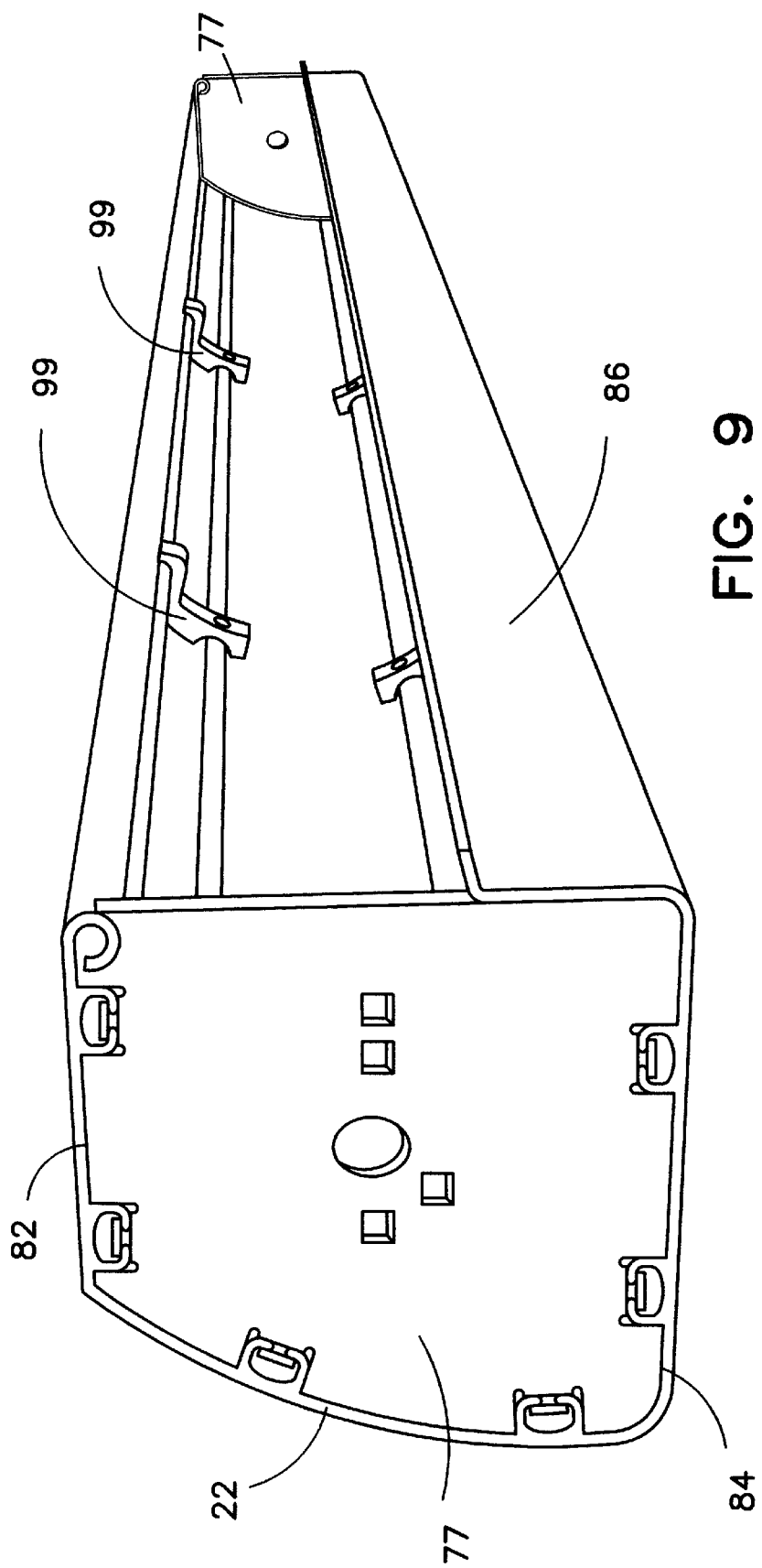
FIG. 9 is a reduced perspective view of the wind deflector assembly shown in FIG. 7.

As described in connection with FIG. 8, the bottom and rear plates can be interconnected with a spanning plate 93. The front deflector plate 22 and top plate 82 can be similarly connected as shown in FIG. 9. A spanning bracket 99 can be provided as illustrated in detail in FIG. 10. The spanning bracket includes opposite ends 101 configured to engage a mounting element 90 in the top plate 82 and a mounting element 25 in the front deflector plate 22. Each opposite end defines an opening 101 of receiving a fastener 91 to fasten the bracket 99 to each of the plates.

Figure 10:
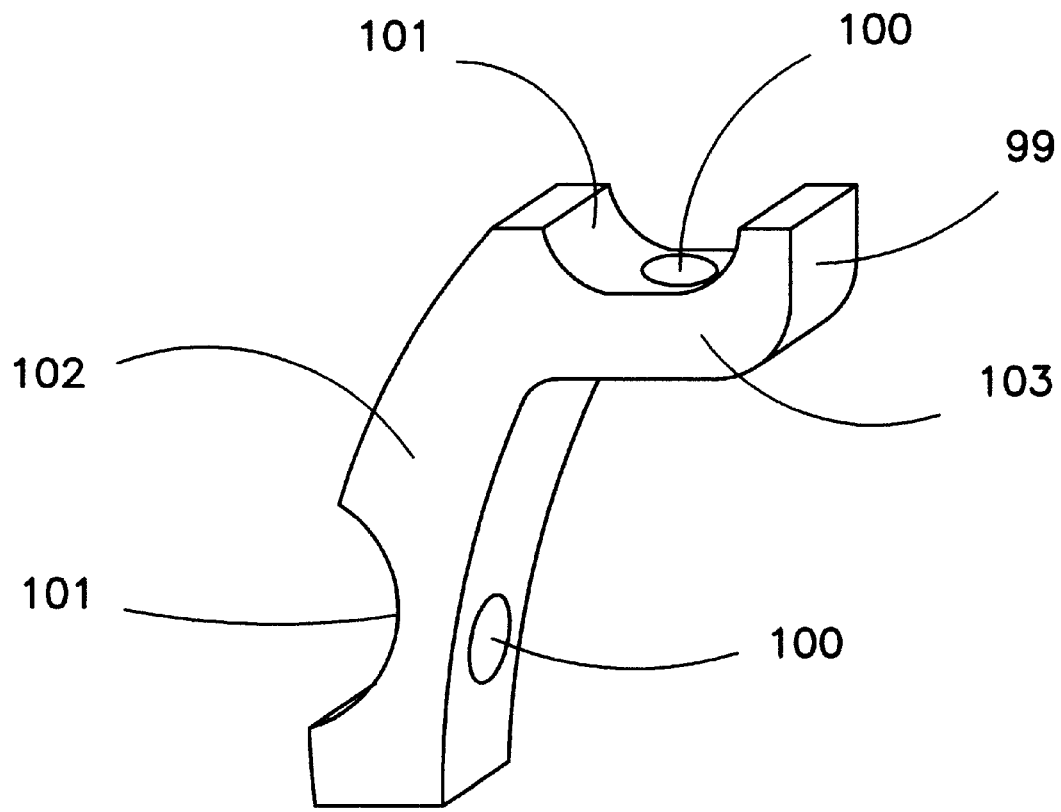
FIG. 10 is a side perspective view of a spanning bracket used with the wind deflector assembly shown in FIGS. 7–9.

As shown in FIG. 10, the spanning bracket 99 includes a front plate portion 102 and a top plate portion 103. Each portion is configured to abut a corresponding plate. Moreover, the two portions are oriented as substantially a 90° angle to span the joint between the top plate 82 and front plate 22. As shown in FIG. 9, a number of these spanning brackets 99 can be attached to the inside surfaces of the top and front plates to help produce a solid and strong wind deflector assembly 75.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For example, the preferred embodiment employs two continuously variable mounting elements 25 and corresponding pairs of notches 37. In accordance with the invention, one of more continuously variable mounting elements can be provided on the deflector plate 22 with a corresponding number of mating components provided on each side plate 24.

In addition, the preferred embodiment contemplates that each of the continuously variable mounting elements 25 span the entire length of the deflector plate 22. The mounting elements so constructed can add some strength and rigidity to the deflector plate. However, since no mounting plates are provided in the middle of the tarping assembly, and consequently in the middle of the deflector plate, the mounting features are not necessary in that part of the plate. In other words, the variable mounting capability is only necessary at the end portions of the deflector plate 22 that become aligned with one of the side mounting plates 24. Thus, the variable mounting elements 25 can extend inboard from each edge 31 a sufficient distance to accommodate all conceivable vehicle widths. If the typical hauling vehicle has a width ranging from 92–102 inches, then the variable mounting elements can extend inboard slightly more than ten inches from each edge.

In the illustrated preferred embodiment, the continuously variable mounting elements 25 are engaged to the flanges 39 by nut and bolt combinations. Other types of fasteners are contemplated that can provide a solid engagement between the deflector plate 22 and side plates 24 that does not loosen over time in the face of road and use induced vibration. As a further alternative, the flanges 39 can be provided with a protruding shank that can extend into the T-slot 26 of a corresponding mounting portion. The protruding shank and mounting portion can be configured for a press-fit or crimped engagement.

What is claimed is:

1. A wind deflector assembly for a roll tarping system mounted on a vehicle, comprising:
   a pair of mounting plates, each associated with a corresponding opposite end of the roll tarping system, each of said mounting plates including a first edge and at least one support member disposed adjacent said first edge;
   an elongated first plate including at least one elongated mounting element defined on an inner surface thereof and arranged to be aligned with said at least one support member; and
   at least two fasteners, at least one each corresponding to one of said pair of mounting plates, each of said fasteners having a first end configured for engagement with said at least one support member and an opposite second end configured for engagement with said elongated mounting element,
   wherein said at least one elongated mounting element is configured for engagement with said at least two fasteners at continuously variable positions along the length of said mounting element.

2. The wind deflector assembly according to claim 1, wherein said elongated first plate has a length greater than a width dimension of said roll tarp system.

3. The wind deflector assembly according to claim 1, wherein:
   said first edge of each of said pair of mounting plates is curved; and
   said inner surface of said first plate is complementary curved for substantially flush engagement with said first edge.

4. The wind deflector assembly according to claim 1, wherein said at least one support member includes a mounting flange projecting from said mounting plate.

5. The wind deflector assembly according to claim 4, wherein:
   each of said pair of mounting plates defines a notch at said first edge associated with each of said at least one mounting flange; and
   said at least one elongated mounting element projects from said inner surface of said first plate and is sized to be received within said notch.

6. The wind deflector assembly according to claim 1, wherein:
   said elongated mounting element defines a T-slot opening into an enlarged channel; and
   each of said at least two fasteners includes a shank portion sized to slidably extend through said T-slot.

7. The wind deflector assembly according to claim 6, wherein:
   said at least one support member includes an opening sized to receive said shank portion; and
   each of said at least two fasteners includes an enlarged head at one end of said shank portion sized for slidably mounting within said enlarged channel.

8. The wind deflector assembly according to claim 7, wherein each of said at least two fasteners includes a mating fastener configured for mating engagement with an opposite end of said shank portion when said shank portion extends through said opening.

9. The wind deflector assembly according to claim 8, wherein said at least two fasteners includes a carriage bolt having an enlarged hex head and a threaded nut.

10. The wind deflector assembly according to claim 1, wherein each of said pair of mounting plates includes two support members, and said elongated first plate includes two elongated mounting elements.

11. The wind deflector assembly according to claim 1, wherein each of said pair of mounting plates includes means for supporting at least a portion of the roll tarping system.

12. The wind deflector assembly according to claim 1, wherein each of said pair of mounting plates includes means for mounting said mounting plate on the vehicle.

13. The wind deflector assembly according to claim 12, wherein said means for mounting includes a mounting portion adjacent a bottom edge of said mounting plate, said mounting portion including an inboard face of said mounting plate configured for abutting an outer surface of the vehicle.

14. The wind deflector assembly according to claim 13, wherein:
   said first plate includes a bottom edge;
   one of said at least one support member of said mounting plates is adjacent said mounting portion such that said bottom edge of said first plate is immediately adjacent said vehicle when said first plate is mounted to said pair of mounting plates mounted to the vehicle.

15. The wind deflector assembly according to claim 1, wherein:
   each of said pair of mounting plates includes a second edge different from said first edge and at least one additional support member disposed adjacent said second edge; and
   said assembly further includes;
      an additional elongated plate including at least one additional elongated mounting element defined on an inner surface thereof and arranged to be aligned with said at least one additional support member adjacent said second edge; and
      at least two additional fasteners, at least one each corresponding to one of said pair of mounting plates, each of said additional fasteners having a first end configured for engagement with said at least one additional support member adjacent said second edge and an opposite second end configured for engagement with said additional elongated mounting element of said additional elongated plate,
      wherein said at least one additional elongated mounting element is configured for engagement with said at least two additional fasteners at continuously variable positions along the length of said additional mounting element.

16. The wind deflector assembly according to claim 15, wherein said additional elongated plate has a length greater than a width dimension of said roll tarp system.

17. The wind deflector assembly according to claim 15, further comprising a bracket sized to span between said first plate and said additional plate, said bracket having opposite ends configured to engage said mounting element in a corresponding one of said first plate and said additional plate.

18. The wind deflector assembly according to claim 15, wherein said second edge is a top edge of said pair of mounting plates, and said additional elongated plate is a top plate.

19. The wind deflector assembly according to claim 18, wherein:
   said pair of mounting plates includes a bottom edge opposite said top edge, a rear edge opposite said first edge, and at least one support member disposed adjacent each of said bottom edge and rear edge; and
   said assembly further includes;
      an elongated bottom plate and rear plate including at least one corresponding elongated mounting element defined on an inner surface thereof and arranged to be aligned with said at least one support member adjacent said respective bottom and rear edges; and
      at least two additional fasteners for each of said bottom and rear plates for engaging said mounting element of said plates to a corresponding support member on said mounting plates.

20. The wind deflector assembly according to claim 19, wherein said bottom and rear elongated plates each have a length greater than a width dimension of said roll tarp system.

21. A wind deflector assembly for a roll tarping system mounted on a vehicle, comprising:
   a pair of mounting plates, each associated with a corresponding opposite end of the roll tarping system, each of said mounting plates including a first edge and at least one mounting flange disposed adjacent said first edge and defining a fastener opening therethrough;
   an elongated first plate defining an inner surface configured for substantially flush engagement with said first edge of each of said pair of mounting plates and including at least one variable location mounting element extending along the length of said first plate; and
   at least two fasteners, at least one each corresponding to one of said pair of mounting plates, each of said fasteners having a first end configured for engagement with said at least one mounting flange at said fastener opening and an opposite second end configured for engagement with said variable location mounting element, wherein said variable location mounting element provides variable mounting locations along the length of said first plate for engagement with said fastener.

22. The wind deflector assembly according to claim 21, wherein:
   each of said pair of mounting plates defines a notch at said first edge associated with each of said at least one mounting flange; and
   said at least one variable location mounting element projects from said inner surface of said first plate and is sized to be received within said notch.

23. The wind deflector assembly according to claim 21, wherein:
   said at least one variable location mounting element defines a T-slot opening into an enlarged channel; and
   each of said at least two fasteners includes a shank portion sized to slidably extend through said T-slot and an enlarged head at one end of said shank portion sized for slidably mounting within said enlarged channel.

24. The wind deflector assembly according to claim 23, wherein each of said at least two fasteners includes a mating fastener configured for mating engagement with an opposite end of said shank portion when said shank portion extends through said opening.

25. The wind deflector assembly according to claim 24, wherein said at least two fasteners includes a carriage bolt having an enlarged hex head and a threaded nut.

26. A method for mounting a wind deflector to a vehicle having a roll tarping system, comprising the steps of:
   mounting a pair of mounting plates to the vehicle at opposite ends of the roll tarping system;
   providing an elongated first plate having at least one continuously variable mounting element defined at an inner surface of the plate, the plate initially having a length greater than the width for covering the roll tarping system;
   cutting the first plate length to substantially match the width for covering the roll tarping system; and
   engaging each mounting plate to the first plate at variable locations along the at least one continuously variable mounting element.

27. The method according to claim 26, further comprising the steps of:
   engaging the first plate to a first edge of the pair of mounting plates;
   providing additional elongated plates for the top and rear edges of the pair of mounting plates, the additional plates having a continuously variable mounting element; and
   engaging the additional plates to the top and rear edges of the mounting plates.

28. The method according to claim 27, further comprising the step of providing and engaging an additional elongated plate to the bottom edge of the mounting plates.

* * * * *